United States Patent
Vetesnik

(10) Patent No.: US 8,485,751 B2
(45) Date of Patent: Jul. 16, 2013

(54) LATCHING DEVICE FOR INSERTION INTO A TUBE FOR LATCHING MOVEMENT OF THE TUBE RELATIVE TO AN EXTERNAL ELEMENT

(75) Inventor: Jan Vetesnik, Winnipeg (CA)

(73) Assignee: Tuffbuilt Products Inc., Winnipeg, Manitoba (CA)

( * ) Notice: Subject to any disclaimer, the term of this patent is extended or adjusted under 35 U.S.C. 154(b) by 633 days.

(21) Appl. No.: 12/497,605

(22) Filed: Jul. 3, 2009

(65) Prior Publication Data

US 2011/0002731 A1    Jan. 6, 2011

(51) Int. Cl.
*F16B 7/10* (2006.01)

(52) U.S. Cl.
USPC ............ 403/109.3; 403/109.1; 403/362; 403/366

(58) Field of Classification Search
USPC ............ 403/109.1–109.6, 109.8, 166, 328, 403/329, 361, 362, 366
See application file for complete search history.

(56) References Cited

U.S. PATENT DOCUMENTS

| | | | | | |
|---|---|---|---|---|---|
| 2,157,335 | A | * | 5/1939 | Haupt | 135/75 |
| 2,517,771 | A | * | 8/1950 | De Stefano | 182/203 |
| 2,577,599 | A | * | 12/1951 | Bethancourt | 73/152.01 |
| 2,980,456 | A | * | 4/1961 | McMullin | 403/328 |
| 3,507,472 | A | * | 4/1970 | Cojei et al. | 248/429 |
| 3,672,710 | A | * | 6/1972 | Kroopp | 403/252 |
| 3,743,147 | A | * | 7/1973 | Wilczynski | 224/199 |
| 3,811,455 | A | * | 5/1974 | Thur | 135/25.4 |
| 4,047,821 | A | * | 9/1977 | Hoke et al. | 403/109.3 |
| 4,247,216 | A | * | 1/1981 | Pansini | 403/109.3 |
| 4,385,849 | A | * | 5/1983 | Crain | 403/109.3 |
| 4,508,468 | A | * | 4/1985 | Irwin | 403/328 |
| 4,595,383 | A | | 6/1986 | Nienhaus | |
| 6,263,895 | B1 | * | 7/2001 | Bang | 135/138 |
| 6,488,439 | B1 | * | 12/2002 | Lackey, Sr. | 403/305 |
| 6,854,916 | B2 | * | 2/2005 | Hsieh | 403/109.3 |
| 6,874,518 | B2 | * | 4/2005 | Porter | 135/124 |
| 7,410,135 | B1 | * | 8/2008 | Dibble et al. | 248/220.21 |
| 7,905,677 | B1 | * | 3/2011 | Erickson | 403/379.3 |
| 2003/0215283 | A1 | | 11/2003 | Hsich | |
| 2008/0292390 | A1 | * | 11/2008 | Walstrom et al. | 403/109.6 |
| 2009/0095856 | A1 | * | 4/2009 | Nakatani | 248/177.1 |

FOREIGN PATENT DOCUMENTS

EP    0812992 A1    12/1997

* cited by examiner

*Primary Examiner* — Michael P Ferguson
*Assistant Examiner* — Nahid Amiri
(74) *Attorney, Agent, or Firm* — Adrian D. Battison; Ade & Company Inc

(57) ABSTRACT

A latching device for insertion into a tube provides two large flat buttons one on each side to lock the tube relative to an outer tube or to two parallel plates. A tubular housing with open ends slides into the tube between the side walls of the tube with the ends of the housing substantially butting inside surfaces of the side walls. The buttons are mounted on respective slide members mounted in the housing spring biased apart so that the buttons can be depressed. One or two set screws acting as stop members can be inserted after the housing is moved to the required location in the tube to prevent depression of the buttons to a position inward of the inner surface of the tube so that the housing is held in place.

9 Claims, 7 Drawing Sheets

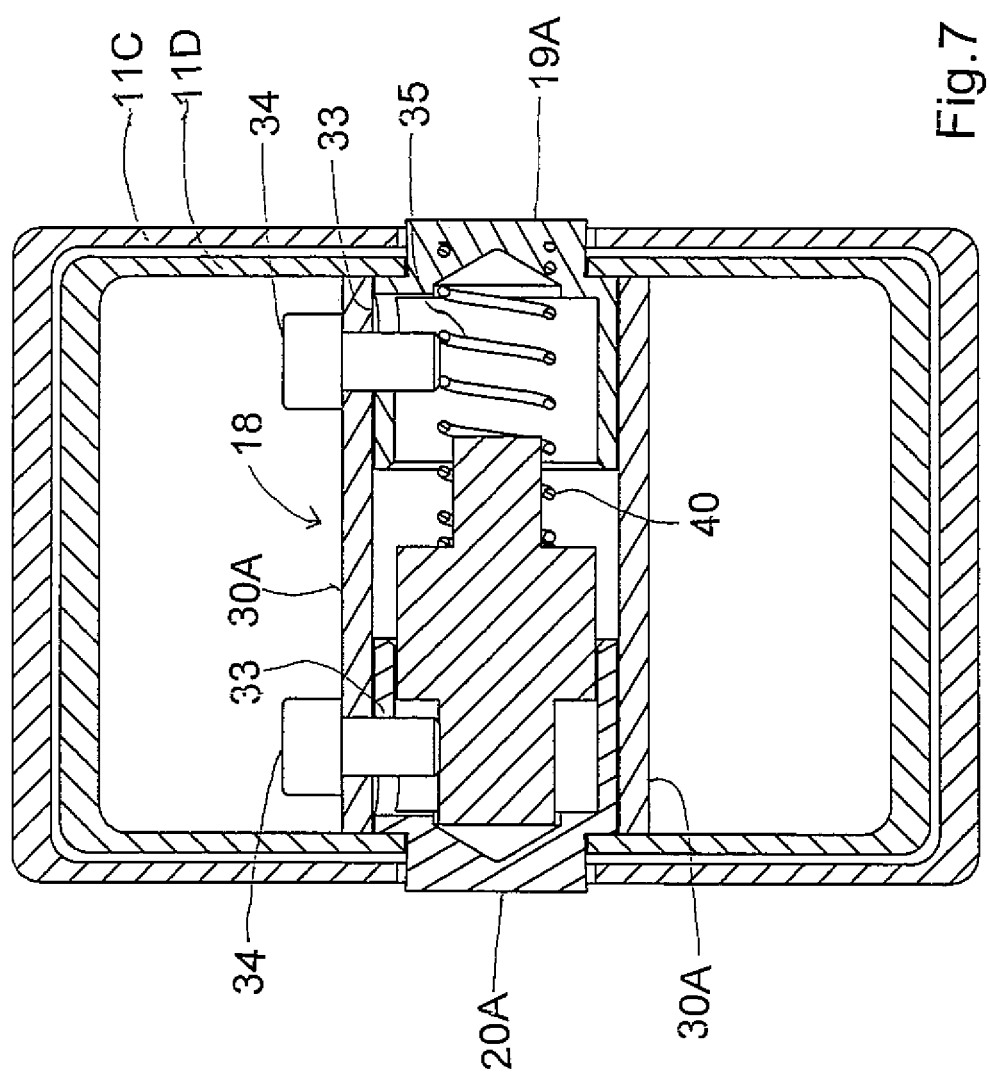

LATCHING DEVICE FOR INSERTION INTO A TUBE FOR LATCHING MOVEMENT OF THE TUBE RELATIVE TO AN EXTERNAL ELEMENT

This invention relates to latching device for insertion into a tube for latching movement of the tube relative to an external element. The latching device can be used to latch the tube relative to an external tube within which the first tube slides in a telescopic arrangement or to latch the tube relative to one or more plates.

BACKGROUND OF THE INVENTION

Typically a telescopic tube arrangement includes a separate pin which can be inserted through aligned holes in the two tubes. This arrangement is disadvantageous in that the pin can be lost or damaged when removed so that the tubes cannot be locked in a required position.

Alternatively a spring biased pin is mounted inside the inner tube and has a rounded end portion which projects outwardly from the inner tube to engage into a hole in the outer tube. This arrangement is generally relatively crude and loose with low accuracy of location and a low level of communication of longitudinal force or rotational torque between the tubes.

SUMMARY OF THE INVENTION

It is one object of the invention to provide an improved latching device for insertion into a tube for latching movement of the tube relative to an external element.

According to one aspect of the invention there is provided a latching device for insertion into a tube for latching movement of the tube relative to an external element, where the tube has two parallel side walls with inside surfaces of the side walls spaced by a hollow interior of the tube, at least one of the side walls of the tube having a hole therein;

the latching device comprising:

a housing shaped and arranged for insertion into the tube longitudinally of the tube with ends of the housing spaced by a distance substantially equal to the spacing between the side walls, such that the housing can slide into the interior of the tube between the side walls with the ends of the housing substantially butting inside surfaces of the side walls;

a slide member mounted in the housing movable longitudinal of the housing and therefore transversely of the tube;

a button on the slide member arranged to project outwardly from one end of the housing such that the button can project through the hole for engagement with the element;

the button arranged such that the button can be depressed, to release engagement with the element, so as to cause sliding movement of the slide member in the housing;

and a spring within the housing for resisting the sliding movement as the button is depressed.

While for best effectiveness, the housing contains two opposed slide members and respective buttons, an arrangement can be provided of a more simple nature which includes only a single button at one end.

Therefore preferably there is provided a second slide member mounted in the housing movable longitudinal of the housing and therefore transversely of the tube with a second button on the second slide member arranged to project outwardly from an end of the housing opposite said one end of the housing such that the second button can project through a second hole opposite the hole for engagement with the element, the second button arranged such that the second button can be depressed, to release engagement with the element, so as to cause sliding movement of the second slide member in the housing relative to the slide member, the spring being arranged to resist the sliding movement as the second button is depressed.

In this arrangement with two buttons, preferably the second slide member slides on said slide member.

In this arrangement with two buttons, preferably the buttons both can be compressed to a position within the housing by a telescoping action of the two slide members.

In this arrangement with two buttons, preferably the slide member and the second slide member overlap when moved to the outwardly to a position where the button and the second button project outwardly from the tube, to prevent binding during operation.

In this arrangement with two buttons, preferably the element has two side walls each along side a respective one of the side walls of the tube and wherein said button and said second button are arranged to engage respective one of the walls of the element for added safety and security.

In this arrangement with two buttons, preferably the second button is movable independently of the first button so that independent operation of each button further improves safety.

In this arrangement with two buttons, preferably in small size devices there is provided a single stop member mounted on the housing and arranged to engage both the first slide member and the second slide member to halt their movement inwardly to a position where the first button and the second button are inward of the inner surface of the wall of the tube.

Alternatively there are provided two separate stop members which engages the first slide member and the second slide member respectively to prevent depression of the buttons.

In this way the single stop member or the two separate stop members can be inserted into place after the housing is moved into place within the tube, whereby the housing can be moved into place to said at least one hole within the tube with the stop member removed, and whereby the insertion of the stop member prevents movement of the housing from the place.

Thus the stop member or members is arranged to hold the housing positively retained after installation by preventing depression of said button and the stop member or members can be removed to allow the housing to be removed if required for service or replacement.

Preferably the button has or the buttons have an outer face which is in an outward position thereof substantially flush with respect to the wall of the element to guard against unintentional disengagement.

Preferably the outer face is substantially flat so as to be flush with the outer surface of the tube when compressed.

Preferably the button has or the buttons a diameter greater than 0.4 inch so as to allow for easier operation while wearing gloves or other personal protective equipment.

In one arrangement of use of the latching device, the element is a second tube within which the tube slides. Preferably the tubes are rectangular (including square) in cross section. However the tubes can also be circular or oval provided there are two side walls or side wall portions against which the ends of the housing can butt and which contain the holes through which the buttons extend.

In one arrangement of use of the latching device, the element is a plate along a surface of which the tube moves or a pair of parallel plates between which the tube moves.

Preferably the housing is tubular with at least one open end so that the slide member can be inserted through the open end.

Thus the locking device can be used to allow for the locking together of two or more telescoping square or rectangular tubes. The device could also be used to allow for the locking in position of a tube or tube assembly fixed so as to rotate between two plates with the device engaging the plates. There are also other potential applications involving the securing of a tube or other member with respect to related structure.

Different sizes of the device can be manufactured to allow for the telescoping of various combinations of up to seven tubes that slide one inside the other. More sizes of tubes may be added (larger or smaller), with the specific dimensions of the device adjusted for larger or smaller tubes as required by a particular design. The design of the device changes slightly for larger sizes where the inner and outer slider buttons are replaced with two pieces of the outer button, and the use of two set screws functioning as separate stops. This becomes possible at this width, as the geometry allows sufficient overlap to provide adequate travel and eliminate jamming with independent buttons.

The arrangement described herein may provide some or all of the following features and advantages:

Design allows for the use of some level of common parts from one size of the device to the other, Design positively engages both walls of the outer tube for added safety and security.

Independent operation of each slider further improves safety.

Large button diameter allows for easier operation while wearing gloves or other personal protective equipment.

The telescoping design of the buttons inside the housing of the device allows for sufficient overlap to prevent binding during operation. The slot in the external slider allows both sliders to stop against the same set screw (or other stop). As noted above, the larger sizes have suitable geometry to provide sufficient overlap without the telescoping, and at this point use two of the external slider to further reduce the number of different parts required.

Flush position of engaged buttons with respect to outer wall of outer tube guards against unintentional disengagement.

While positively retained after installation, the device may be removed if required for service or replacement.

Enclosed design of the device offers protection against contamination that may affect the function.

Spring action provides audible "click" as an indication of engagement, flush position of buttons provides visual indication of engagement.

Relatively large diameter of buttons provides additional load carrying capacity when installed in relatively thin walled tubes.

Replaces externally inserted pins which are prone to loss, damage.

Flush design reduces chance of injury or property damage caused by snagging on protruding pins or other hardware.

Design allows for easy installation of the device by removing the set screw or other type of fastener or other component functioning as a stop, compressing the buttons against the spring, and slipping inside the receiver tube. Upon reaching the holes in the tubing, the device snaps into place in the proper location. The device is positively secured after installation by inserting the set screw which itself may be further secured mechanically, with an adhesive, or by other means. The stop prevents sufficient movement of the buttons to disengage the device from the receiver tube walls.

The feature of the removable stop for purposes of installation is important to the overall design. The telescoping arrangement of the sliders and the slot in the outer slider allowing the stop to act for both sliders.

BRIEF DESCRIPTION OF THE DRAWINGS

One embodiment of the invention will now be described in conjunction with the accompanying drawings in which:

FIG. 7 is a cross sectional view of a second embodiment of the latching device taken along the lines 2-2 of FIG. 1.

In the drawings like characters of reference indicate corresponding parts in the different figures.

DETAILED DESCRIPTION

Figure 1:
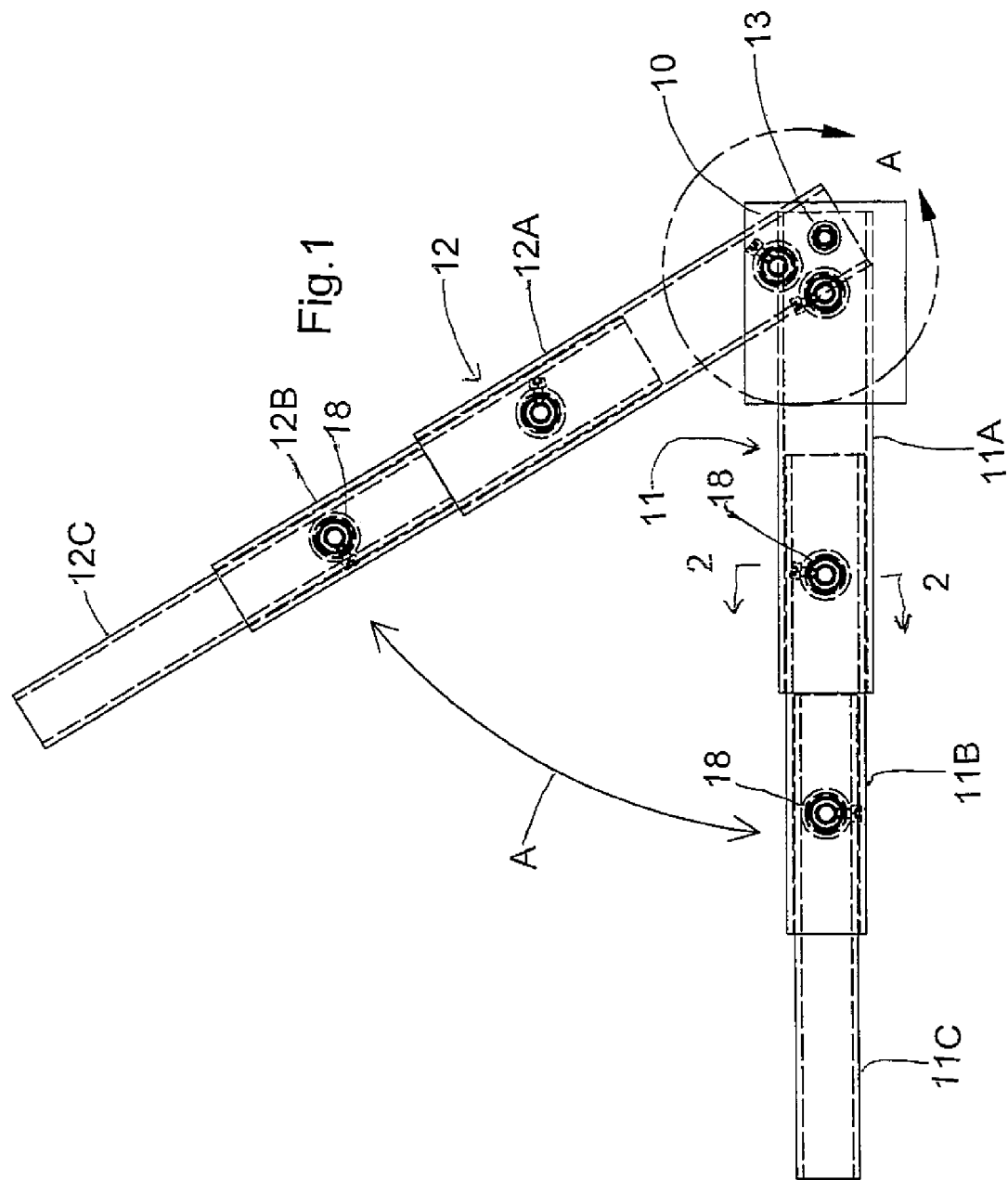
FIG. 1 is a side elevational view of an assembly including two telescopic tubes attached at a center mounting and including latching devices according to the present invention allowing the tubes to be extended and the tubes to be angularly adjusted relative to the center mounting.
Figure 2:
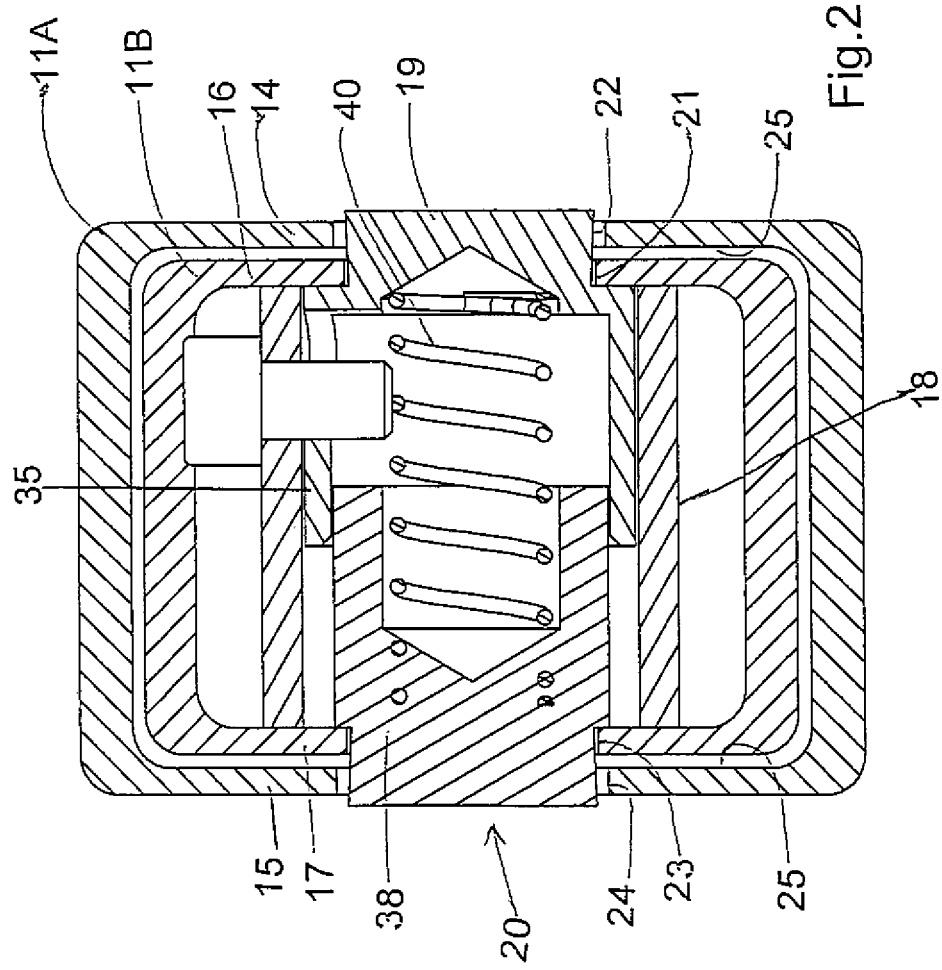
FIG. 2 is a cross sectional view of a first embodiment the latching device taken along the lines 2-2 of FIG. 1.
Figure 3:
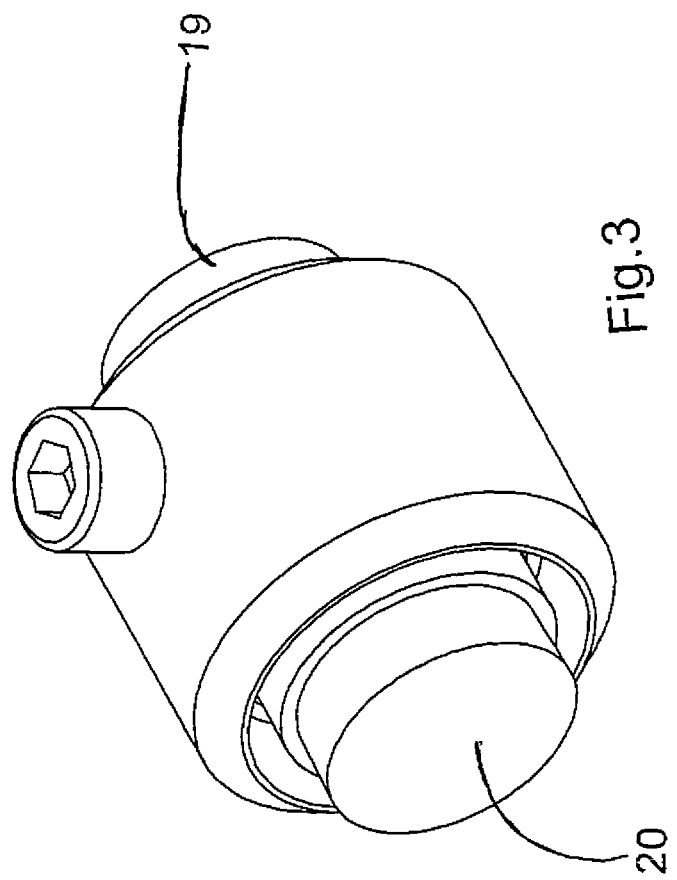
FIG. 3 is an isometric view of the latching device of FIG. 2.
Figure 4:
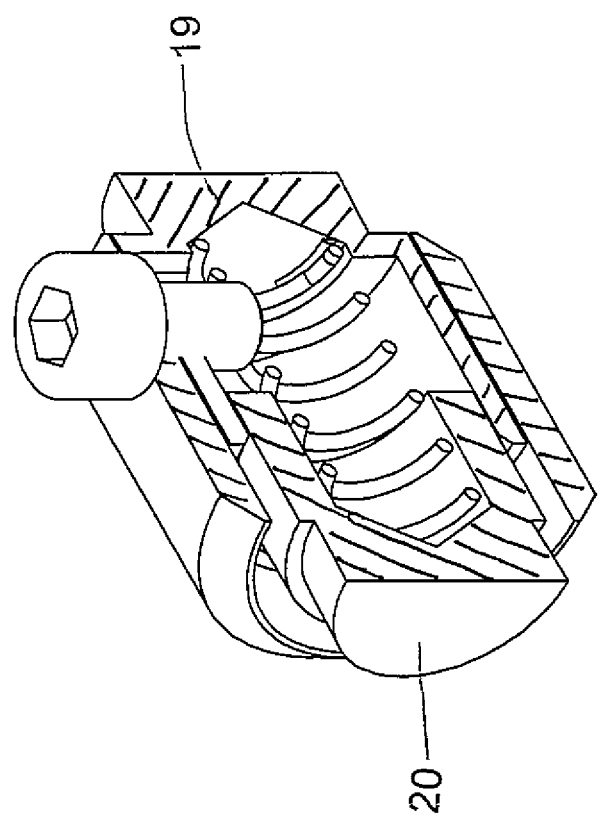
FIG. 4 is an isometric view of the latching device of FIG. 2 cut along a center line.
Figure 5:
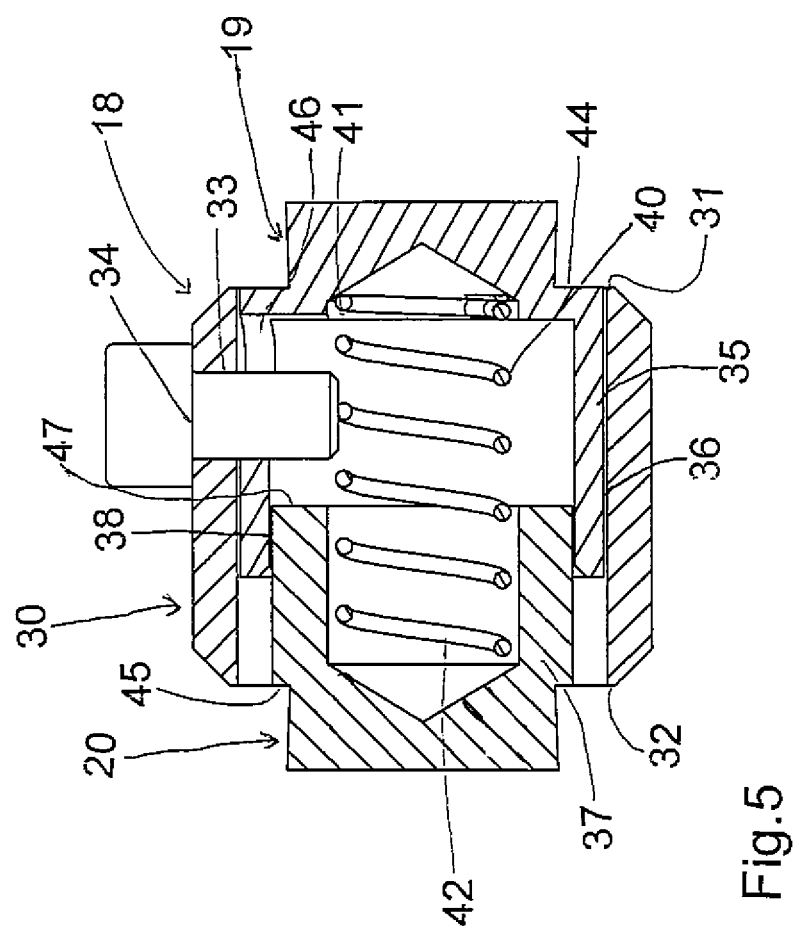
FIG. 5 is a front elevational view of the latching device of FIG. 4.

In FIG. 1 is shown a construction including a central member 10 defined by a pair of parallel plates between which is mounted a pair of legs 11 and 12. The leg 11 is mounted in fixed position relative to the plates 10 so that it remains at a fixed angular position relative to those plates. The leg 12 can pivot around a pin 13 so that it can be moved from a position aligned with the leg 11 to an angular position through an angle A to an angularly spaced position and latched in place at that position. Each leg 11 and 12 is formed from a plurality of separate leg pieces 11A, 11B and 11C together with pieces 12A, 12B and 12C. The number of pieces is of course variable and the construction shown in FIG. 1 is merely one example of arrangements of this type. Each of the legs is formed from tubular members so that two of the tubular members are indicated in FIG. 2 at 11A and 11B with one which is smaller that is 11B slidable within the larger leg portion 11A. The leg portions are of a rectangular tube so that the outer tube 11A defines side walls 14 and 15 which are parallel to corresponding side walls 16 and 17 of the inner tube 11B. Similarly the outer tube 11A co-operates with the parallel plates of the center member 10 in a similar manner so the outer side walls 14 and 15 of the outer tube 11A have outside of them parallel plates (not shown).

The movement of each piece of the structure relative to the next adjacent piece is locked by a series of individual latching members 18 arranged between each member and the next adjacent member. Thus each latching member is located inside the inner one of the members of a pair and provides a pair of buttons 19 and 20 which project outwardly through aligned holes in the side walls so as to latch the members in place at the required location with the buttons being depressible as required to release the latching action and allow the two members to slide one relative to the other. In this way the legs 11 and 12 can be moved from a retracted position to an extended position and the leg 12 can be moved relative to the plates 10 by pivotal movement to the angularly spaced position. The construction of FIG. 1 is shown in a simplified form as merely one example and in most cases the latching devices 18 will co-operate in a retracted position with a first pair of holes in the outer member and will co-operate in an extended position with a second pair of holes in the outer member. It will be appreciated that of course additional holes can be provided for indexed adjustment of the angular position or of the state of extension of the legs.

One of the latching devices is shown in FIGS. 2 through 6 where the buttons 19 and 20 are shown at opposite ends of the latching device for projection through holes in the tubular members 11A and 11B. Thus it will be appreciated that the button 19 projects through a circular hole 21 in the inner tube 11B and then extends into a hole 22 in the tubular member 11A. Symmetrically the button 20 projects through a hole 23 in the tubular member 11B and extends into a hole 24 in the tubular member 11A. In operation the buttons 19 and 20 can be depressed by pressure against the outside surface thereof to apposition where they are retracted inwardly of an inside surface 25 of the side walls of the outer tube 11A thus releasing the buttons 19 and 20 from the respective holes 22 and 24 and allowing the latching device and its buttons to slide along the inside surface 25 to the next hole as required.

The latching device 18 includes an outer cylindrical housing 30 which has open ends 31 and 32. A hole 33 is provided in the wall of the cylindrical housing 30 which allows insertion of a screw threaded set screw 34 into a female thread on the hole 33. This allows the set screw to project inwardly inside the cylindrical housing 30 to provide side surfaces which can act as a stop member within the interior of the housing member 30.

The button 19 is attached to an outer slide member 35 which has an outer surface 36 slidable along the inside surface of the tubular housing 30. The button 20 is attached to a second slider member 37 which has an outer surface 38 slidable along an inside surface of the outer slide member 35. Thus these two slide members are telescopic and are guided in relative sliding movement by the cooperation between the outside surface of the inner slide member and the inside surface of the outer slide member. In the position shown in FIG. 5, these inner and outer slide members overlap to an extent which is sufficient to prevent twisting one relative to the other and to extent sufficient to provide effective guiding action so as to ensure that both slide members move along a longitudinal axis of the cylindrical housing without binding and with a smooth sliding action.

A spring 40 is located inside the slide members within a hollow interior thereof with a first end 41 of the spring butting against an inner end of the button 19 and an opposed end 42 of the spring butting against an inside surface of the button 20. The spring has a length to bias the buttons apart so that they are pushed outwardly with a spring force sufficient to press them outwardly into engagement with the tubular members as required and as described hereinafter.

Figure 6:
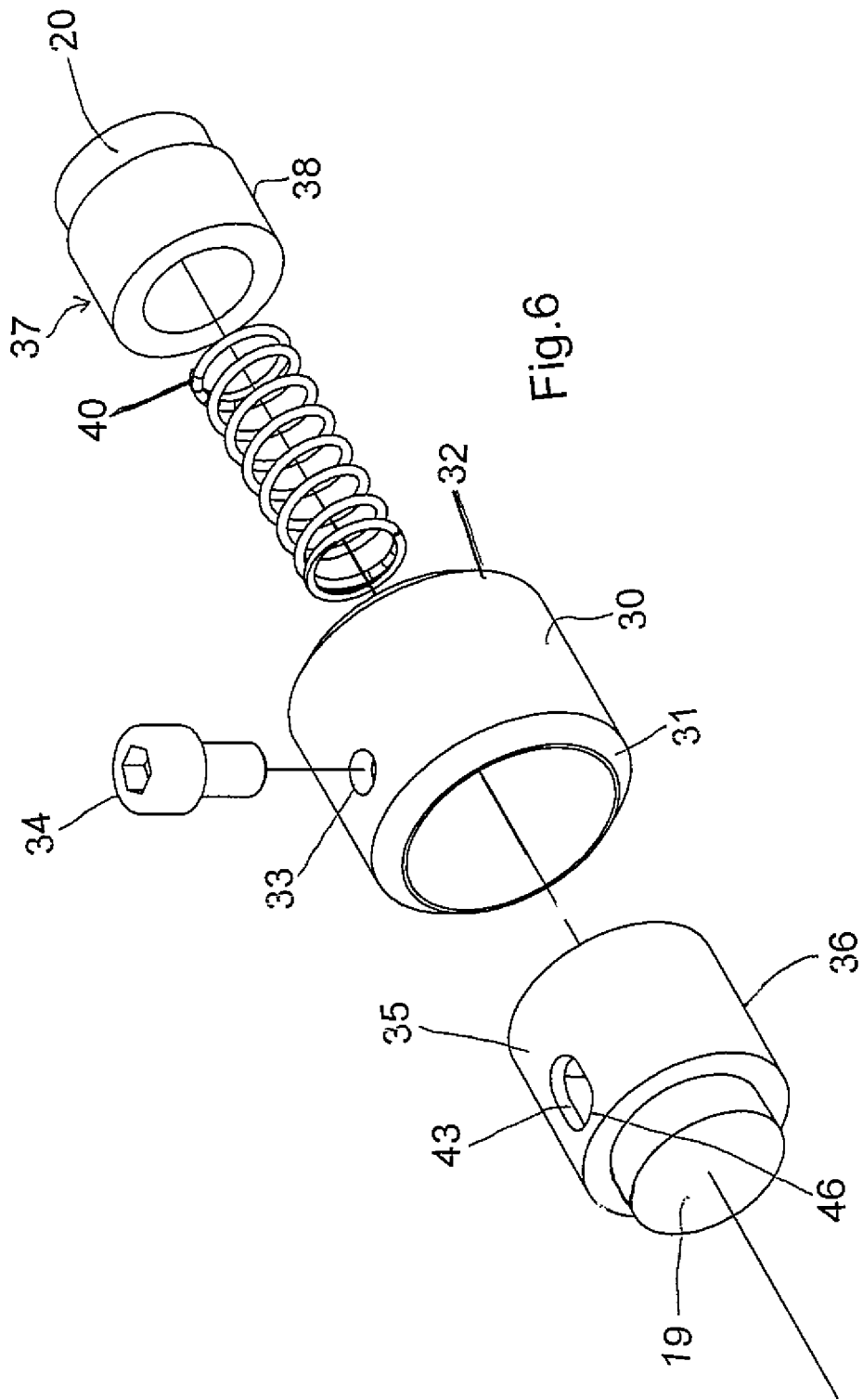
FIG. 6 is an isometric view of the latching device of FIG. 2.

The outer slide member 35 as best shown in FIG. 6 includes a hole 43 which is elongate. The hole 43 is dimensioned to receive in transverse width the diameter of the set screw 34 but is elongate in the longitudinal length along the axis 44 of the housing so as to allow the outer slide member 35 to move longitudinally within the housing between a retracted position and an extended position of the button 19. The outer slide member 35 includes an annular shoulder 44 surrounding an inner end of the button 19. Symmetrically the inner slide member 38 includes a shoulder 45 surrounding the inner end of the button 20. It will be noted that the shoulder 45 is of smaller outer diameter than the shoulder 44 since the outer surface 38 of the inner slide member must slide within the outer slide member as previously described.

With the set screw in place, the set screw acts to locate an inward most position of depression of the buttons 19 and 20. Thus the outer slide member 35 can only be depressed until an edge 46 of the hole 43 butts against a side wall of the set screw 34. Similarly the button 20 can only be depressed until an end wall 47 of the inner slide member butts against the side wall of the set screw 34. The set screw therefore limits the inner movement of the two buttons.

The length of the housing is such that it extends across the space between the side walls 16 and 17 of the inner tube 11B. Thus the housing is a sliding fit within the tube 11B and can be inserted from an end of the tube 11B to slide along the inside surface to the required position at the holes 21 and 23. In assembly of the structure, therefore, with the set screw 34 removed from the housing, the outer slide member 35 can be inserted into one end of the housing and can slide freely along the inside surface of the housing. With the slide member 35 located with its end inserted within the housing and the button projecting outwardly from the end of the housing, the spring 40 can be inserted into place and dropped into engagement with the inner end of the button 19. In this position the inner slide member 37 can also be slid into place against the spring pressure until its outer surface 38 slides on the inside surface of the outer slide member. At this position the slide members are properly positioned within the housing and in the absence of the set screw the buttons can be depressed inwardly until they are flush with the outside ends of the housing so as to be flush at the ends 31 and 32. As the buttons are flushed with the ends 31 and 32, the whole structure can be inserted into the end of the tube 11B and can slide along the tube 11B until the buttons reach the holes 21 and 23. At that position the buttons can move outwardly and snap into the holes 21 and 23 under the pressure of the spring 40 to hold the housing in place within the tube 11B.

However it will be appreciated that the housing can be simply released from its engaged position with the holes by depressing the buttons again until they take a position flush with the ends 31 and 32. Thus the insertion into the housing of the set screw 34 through the open end of the tube 11B until the set screw takes up its position as a stop member inside the housing operates to prevent the buttons from being depressed sufficiently to release the buttons from the holes 21 and 23. In this way the insertion of the set screw fixes the housing in place and prevents the housing from being removed from its place at the holes 21 and 23 until the set screw is again removed. In normal operation, the set screw remains in place and holds the housing at the required location. Should the housing and the elements contained therein require to be removed for service, this can be simply obtained by releasing the set screw 34 from its position, depressing the buttons 19 and 20 and allowing the housing to be again removed to the initial position.

With the set screw in place, and the housing thus fixed in place within the holes 21 and 23 of the tube 11B, the buttons 19 and 20 are prevented from moving outwardly beyond a required position by the shoulders 44 and 45 which move to a position in the plane of the ends 31 and 32 and thus butt against the inside surfaces 25 of the walls 16 and 17 of the tube 11B.

In this way the buttons project outwardly from the outside surface of the tube 11B by a predetermined extent which is calculated to be sufficient to extend so as to be substantially flush with the outside surfaces of the walls 14 and 15.

The buttons are circular with a flat outer face. The buttons have a diameter of at least 0.4 inches and preferably of the order of 0.5 to 0.75 inches so that they can be readily depressed by a person wearing gloves or other protective equipment. In addition the buttons are solid cylindrical members in the area of the walls 14 and 15 and the walls 16 and 17 so that they transfer sheer forces between those walls. The use of two buttons is preferred in that this transfers forces on both sides of the tube thus providing a structural member at the walls between the tube so as to provide transfer of significant strength.

The use of a flat outer face of the buttons which is substantially flush with the outer surface of the outer tube provides a surface which avoids the presentation of projecting elements or snagging elements which could catch on equipment or clothing with the risk of damage.

It will be appreciated that the release of the outer tube from the inner tube simply by depressing the buttons to their inward stopped position against the stop member defined by the set screw 34 in which position the outside flat surface of the button is depressed to a position substantially flush with the outside surface of the inner tube allowing release of the outer tube from its engagement with the buttons.

In order to allow the release of the outer tube from the inner tube it is necessary to depress both buttons simultaneously so that there is a reduced risk that the button could be inadvertently depressed by engagement with an element of the environment causing inadvertent release.

Turning now to FIG. 7, there is shown an alternative arrangement which is used for larger dimension tubes. Thus the arrangement of FIG. 2 might be used with the smaller or innermost tubes and the outer or outermost tubes might use the construction shown in FIG. 7. Thus in FIG. 7 an outer tube is indicated at 11C and the inner tube is indicated at 11D. The latching device generally indicated at 18 includes a housing 30A with buttons 19A and 20A. In this arrangement two of the outer slide members 35 are used so that these are in effect symmetrical and carry the buttons 19A and 20A. Both of these therefore slide on the inside surface of the housing 30A and both use the set screw 34 as the limiting device which controls inward and outward movement of the slide members as defined by the respective holes 33 in the housing 30A. The spring 40 is provided as before and co-operates to press the buttons 19A and 20A outwardly.

This construction operates in a similar manner to that previously described except that it is necessary during installation to apply the two separate set screws 34 after the housing is slid into place to the holes in the inner tube 11D.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A latching assembly comprising:
a first tubular member which has two first side walls with inside surfaces of the side walls spaced by a hollow interior of the first tubular member, at least one of the first side walls having a first hole therein;
a second tubular member telescopically receiving and movable relative to the first tubular member between a connected position of the first and second tubular members and an unconnected position of the first and second tubular members;
the second tubular member having two second side walls with inside surfaces of the second side walls located adjacent a respective outside surface of the first side walls for sliding movement relative thereto between the connected and unconnected positions;
at least one of the second side walls having a second hole therein which is aligned with the first hole in the connected position; and a latching device comprising:
a housing having side walls defining a hollow interior shaped and arranged for insertion between and engagable with the first side walls with ends of the housing spaced by a distance substantially equal to the spacing between the inside surfaces of the first side walls so as to define a longitudinal direction of the housing transverse to the first side walls;
a slide member having walls defining an abutment surface and an abutment receptacle mounted in the housing and movable along the longitudinal direction of the housing that is transverse to the first side walls;
a button connected to the slide member so that depression of the button causes common sliding movement of the button and the slide member;
the button being arranged to project outwardly from one end of the housing such that the button projects through the first hole to a projecting position of an outer end thereof at least partly through the second hole, when the first and second holes are aligned in the connected position;
the button being movable along the longitudinal direction of the housing from the projecting position by depressing the button to a release position of the button in which the end surface of the button is inward of the inside surface of the second tubular member;
a spring within the housing engaging the abutment surface of the slide member for resisting the sliding movement as the button is depressed; and
a stop member inserted through an opening in one of the side walls of the housing which engages the abutment receptacle in the walls of the slide member to prevent depression of the button to a position in which the end surface of the button is inward of the inside surface of the first tubular member;
the stop member being removable out of engagement with the slide member to allow the end surface of the button to be moved to a position inward of the inside surface of the first tubular member and thus released from the first hole;
so that, with the end surface of the button released from the first hole, the housing is movable along the interior of the first tubular member away from the first hole;
and so that, with the end surface of the button prevented by the stop member from being released from the first hole, the housing is prevented from movement along the first tubular member away from the first hole.

2. The latching assembly according to claim 1 wherein said stop member is arranged to hold the housing positively retained after installation by preventing depression of said button and wherein the stop member is removable to allow the housing to be removed if required for service or replacement.

3. The latching assembly according to claim 1 wherein an outer face of said button in the projecting position thereof is substantially flush with respect to the outer surface of the wall of the second tubular member.

4. The latching assembly according to claim 1 wherein an outer face of said button is substantially flat.

5. The latching assembly according to claim 1 wherein said button has a diameter greater than 0.4 inch.

6. The latching assembly according to claim 1 wherein the first and second tubular members are rectangular in cross section.

7. The latching assembly according to claim 1 wherein the housing is tubular with at least one open end through which the slide member is inserted.

8. A latching assembly comprising:
a first tubular member which has two first side walls with inside surfaces of the first side walls spaced by a hollow interior of the first tubular member;
each of the first side walls having a respective one of two first holes therein;
a second tubular member telescopically receiving and movable relative to the first tubular member between a connected position of the first and second tubular members and an unconnected position of the first and second tubular members;
the second tubular member having two second side walls with inside surfaces of the second side walls located adjacent a respective outside surface of first side walls for sliding movement relative thereto between the connected and unconnected positions;
each of the second side walls having a respective one of two second holes therein;
and a latching device comprising:
a housing having side walls defining a hollow interior shaped and arranged for insertion between and engagable with the first side walls with ends of the housing spaced by a distance substantially equal to the spacing between the inside surfaces of the first side walls so as to define a longitudinal direction of the housing transverse to the first side walls;
a first slide member having walls defining an abutment surface and an abutment receptacle mounted in the housing and movable the longitudinal direction of the housing that is transverse to the first side walls;
a first button connected to the first slide member so that depression of the button causes common sliding movement of the button and the first slide member;
the first button being arranged to project outwardly from a first end of the housing such that the first button projects through a respective one of the first holes to a projecting position of an outer end thereof at least partly through a respective one of the second holes, when said respective ones of the first and second holes are aligned in the connected position;
the first button being movable from the projecting position by depressing the first button to a release position of the first button in which the end surface of the first button is inward of the inside surface of the second tubular member so as to cause sliding movement of the first slide member in the housing;
a second slide member having walls defining an abutment surface and an abutment receptacle mounted in the housing and movable along the longitudinal direction of the housing that is transverse to the first side walls;
a second button connected to the second slide member so that depression of the button causes common sliding movement of the button and the first slide member;
the second button being arranged to project outwardly from a second end of the housing such that the second button projects through a respective one of the first holes to a projecting position of an outer end thereof at least partly through a respective one of the second holes, when said respective ones of the first and second holes are aligned in the connected position;
the second button being movable from the projecting position by depressing the second button to a release position of the second button in which the end surface of the second button is inward of the inside surface of the second tubular member so as to cause sliding movement of the second slide member in the housing;
at least one spring engaging each abutment surface of the first and second slide members within the housing for resisting the sliding movement of the first and second slide members as the first and second buttons are depressed;
and a stop member inserted through an opening in one of the side walls of the housing which engages the abutment receptacle in the walls of the first and second slide members to prevent depression of the first and second buttons to a position in which the end surface of each of the buttons is inward of the inside surface of the first tubular member;
the stop member being removable out of engagement with the slide members to allow the end surfaces of the first and second buttons to be moved to a position inward of the inside surface of the first tubular member and thus released from the first holes;
so that, with the end surface of the first and second buttons released from the first holes, the housing is movable along the interior of the first tubular member away from the first holes;
and so that, with the end surface of the first and second buttons prevented by the stop member from being released from the first holes, the housing is prevented from movement along the first tubular member away from the first holes.

9. A latching assembly comprising:
a first tubular member which has two first side walls with inside surfaces of the first side walls spaced by a hollow interior of the first tubular member;
each of the first side walls having a respective one of two first holes therein;
a second tubular member telescopically receiving and movable relative to the first tubular member between a connected position of the first and second tubular members and an unconnected position of the first and second tubular members;
the second tubular member having two second side walls with inside surfaces of the second side walls located adjacent a respective outside surface of first side walls for sliding movement relative thereto between the connected and unconnected positions;
each of the second side walls having a respective one of two second holes therein;
and a latching device comprising:
a housing having side walls defining a hollow interior shaped and arranged for insertion between and engagable with the first side walls with ends of the housing spaced by a distance substantially equal to the spacing between the inside surfaces of the first side walls so as to define a longitudinal direction of the housing transverse to the first side walls;
a first slide member having walls defining an abutment surface and an abutment receptacle mounted in the housing and movable along the longitudinal direction of the housing that is transverse to the first side walls;
a first button connected to the first slide member so that depression of the button causes common sliding movement of the button and the first slide member;
the first button being arranged to project outwardly from a first end of the housing such that the first button projects through a respective one of the first holes to a projecting position of an outer end thereof at least partly through a respective one of the second holes, when said respective ones of the first and second holes are aligned in the connected position;

the first button being movable from the projecting position by depressing the first button to a release position of the first button in which the end surface of the first button is inward of the inside surface of the second tubular member so as to cause sliding movement of the first slide member in the housing;

a second slide member having walls defining an abutment surface and an abutment receptacle mounted in the housing and movable along the longitudinal direction of the housing that is transverse to the first side walls;

a second button connected to the second slide member so that depression of the button causes common sliding movement of the button and the first slide member;

the second button being arranged to project outwardly from a second end of the housing such that the second button projects through a respective one of the first holes to a projecting position of an outer end thereof at least partly through a respective one of the second holes, when said respective ones of the first and second holes are aligned in the connected position;

the second button being movable from the projecting position by depressing the second button to a release position of the second button in which the end surface of the second button is inward of the inside surface of the second tubular member so as to cause sliding movement of the second slide member in the housing;

at least one spring engaging at least one of the abutment surface of the first and slide members within the housing for resisting the sliding movement of the first and seconds slide members as the first and second buttons are depressed;

a first stop member inserted through an opening in one of the side walls of the housing which engages the abutment receptacle of the first slide member to prevent depression of the first button to a position in which the end surface of the first button is inward of the inside surface of the first tubular member;

the first stop member being removable out of engagement with the first slide member to allow the end surface of the first button to be moved to a position inward of the inside surface of the first tubular member and thus released from the respective one of the first holes;

a second stop member inserted through an opening in one of the side walls of the housing which engages the abutment receptacle of the second slide member to prevent depression of the second button to a position in which the end surface of the first button is inward of the inside surface of the first tubular member;

the second stop member being removable out of engagement with the second slide member to allow the end surface of the second button to be moved to a position inward of the inside surface of the first tubular member and thus released from the respective one of the first holes;

so that, with the end surface of the first and second buttons released from the respective one of first holes, the housing is movable along the first tubular member away from the first holes;

and so that, with the end surface of the first and second buttons prevented by the first and second stop members from being released from the first holes, the housing is prevented from movement along the first tubular member away from the first holes.

* * * * *